US012664309B2

(12) United States Patent
Kulkarni et al.

(10) Patent No.: US 12,664,309 B2
(45) Date of Patent: Jun. 23, 2026

(54) OBFUSCATION OF CONTENT BASED UPON CONTEXT OF AND PATTERN OF DATA WITHIN THE CONTENT

(71) Applicant: The Travelers Indemnity Company, Hartford, CT (US)

(72) Inventors: Santosh Kulkarni, Lewis Center, OH (US); Beraa A. Ibas, Ludlow, MA (US); Matthew L. Cather, Boyce, VA (US)

(73) Assignee: The Travelers Indemnity Company, Hartford, CT (US)

( * ) Notice: Subject to any disclaimer, the term of this patent is extended or adjusted under 35 U.S.C. 154(b) by 133 days.

(21) Appl. No.: 18/496,243

(22) Filed: Oct. 27, 2023

(65) Prior Publication Data

US 2025/0139288 A1 May 1, 2025

(51) Int. Cl.
G06F 21/62 (2013.01)
G06F 21/60 (2013.01)

(52) U.S. Cl.
CPC ........ G06F 21/6254 (2013.01); G06F 21/604 (2013.01)

(58) Field of Classification Search
CPC .......................... G06F 21/6254; G06F 21/604
See application file for complete search history.

(56) References Cited

U.S. PATENT DOCUMENTS

| | | | | |
|---|---|---|---|---|
| 10,304,354 | B1 * | 5/2019 | DuQuette ................ | G09B 7/04 |
| 10,984,316 | B2 * | 4/2021 | Qiao ................... | G06F 21/6245 |
| 11,093,632 | B1 | 8/2021 | Ton-That | |
| 11,294,939 | B2 * | 4/2022 | Malhotra ................ | H04L 63/04 |
| 2015/0309987 | A1 * | 10/2015 | Epstein ................... | G06F 40/30 |
| | | | | 704/9 |
| 2021/0034719 | A1 * | 2/2021 | Brown .................... | G06F 21/14 |
| 2021/0051294 | A1 * | 2/2021 | Roedel ............... | G06F 21/6245 |
| 2021/0182429 | A1 * | 6/2021 | Chen ....................... | H04L 51/10 |
| 2021/0182439 | A1 * | 6/2021 | Singh .................. | G06F 21/6245 |
| 2022/0253744 | A1 * | 8/2022 | Sloane .................... | G06F 18/24 |
| 2023/0409747 | A1 * | 12/2023 | Pierce .................... | G06F 21/14 |
| 2024/0070312 | A1 * | 2/2024 | Kwok ................. | G06F 21/6245 |
| 2024/0323034 | A1 * | 9/2024 | Kumar ................. | H04L 9/3268 |

* cited by examiner

*Primary Examiner* — Mohammad A Siddiqi
(74) *Attorney, Agent, or Firm* — Dilworth IP, LLC

(57) ABSTRACT

A system, method, and program product are presented for causing a processor of a computing device to receive content, determine a context of the content, and when the determined context is relevant for obfuscation, scan the content to identify information that matches, within the context, one of a plurality of data patterns indicative of being sensitive information. The processor further executes to assign a confidence value to the identifying process. When the sensitive information is identified with the confidence value above a confidence threshold, the processor executes to generate an obfuscated version of the sensitive information within the content, replace the sensitive information with the obfuscated version to form updated content, and output the updated content. The context may include at least one of a feature or a subject, a manner of use, and/or a determination of a user accessing, transmitting, or receiving the received content.

17 Claims, 5 Drawing Sheets

OBFUSCATION OF CONTENT BASED UPON CONTEXT OF AND PATTERN OF DATA WITHIN THE CONTENT

COPYRIGHT NOTICE

BACKGROUND OF THE INVENTION

1. Technical Field

The present disclosure relates generally to data processing systems, methods, and computer program products, and, more particularly, the present disclosure is related to obfuscation of content within data processing systems based upon a context of the content and identified data patterns within the content.

2. Related Art

Protection of sensitive information such as, for example, personally identifiable information (PII) such as social security numbers, tax identification numbers, birth dates and the like, health information such as medical records, health conditions, and the like, financial information such as bank account numbers, credit card numbers and the like, stored and used within data processing systems is typically required in the United States of America (USA), by state and federal laws and regulations such as the Health Insurance Portability and Accountability Act (HIPAA), and the California Consumer Privacy Act (CCPA), and the like, and outside the USA by regulations including, for example, the General Data Protection Regulation (GDPR) of the European Union. Additionally, many companies have compliance programs that require protection of customer and company sensitive information.

Known methods for identifying sensitive information in data processing systems include pattern matching or keyword searches. Once identified, the sensitive information can be programmatically obfuscated or masked within storage devices of the data processing systems. While laws and regulations are primarily concerned with preventing unauthorized access to sensitive information outside a company, an inadvertent or accidental disclosure of sensitive information within the company can also be harmful. Accordingly, within companies where legitimate uses of sensitive information are permissible, there are still occasions where sensitive information should be anonymized or otherwise obfuscated for some uses and/or users. For example, merely identifying and obfuscating sensitive information within storage devices may be an ineffective solution. Additionally, the inventors have recognized that identifying sensitive information by pattern matching and/or keyword searching alone, can be ineffective, for example, sometimes identifying information that may fit a predefined data type or pattern, but where the information is not sensitive information.

Accordingly, there is a need for more efficient and reliable systems, methods, and computer program products for identifying and obfuscating sensitive information within content not only based upon patterns of the data within the content but also based upon the context of the content.

SUMMARY OF THE INVENTION

The present disclosure is directed to a system, a method, and a computer program product that, when executed, causes a processor of a computing device to receive content, determine a context of the received content, and when the determined context is relevant for obfuscation, scan the received content to identify information therein that matches, within the determined context, one of a plurality of data patterns indicative of the information being sensitive information. The processor further executes to assign a confidence value to the identifying of sensitive information. When the scanned content includes sensitive information identified with the assigned confidence value above a predetermined confidence threshold, the processor further executes to cause the computing device to generate an obfuscated version of the identified sensitive information within the received content, replace the identified sensitive information with the obfuscated version of the identified sensitive information within the received content to form updated content, and output the updated content.

In one embodiment, the context includes at least one of a feature or a subject of the received content, a manner of use of the received content, and a determination of a user at least one of accessing, transmitting, and receiving the received content. In one embodiment, the subject is indicative of a feature of the received content and a relationship of the received content to one or more persons and entities. In one embodiment, the feature and relationship of the received content is indicative of at least one of personally identifiable information, biometric information, financial information, health information, authentication credential information, encryption key and certificate information, and location information. In another embodiment, the manner of use of the received content is at least one of a confidential communication, a confidential storage of the information, a legal proceeding, an educational record, a governmental record, a pattern of behavior of an individual, and a relationship between two or more individuals. In still another embodiment, the user of the information has a security level such that access to un-obfuscated information is unauthorized.

In one embodiment, the data patterns are each definable in one of a plurality of template formats. In one embodiment, the plurality of template formats includes user definable template formats. In another embodiment, the plurality of template formats includes template formats automatically defined by the computing device based upon a relationship of information within the received content. In one embodiment, the relationship of information includes at least one of a detected variation within the content from the template format and a learned data pattern derived from one or more machine-learning algorithms that draw inferences from patterns of data within the received content. In one embodiment, the data patterns includes at least one of a date format, an address format, a social security number format, a financial account number format, an insurance policy number format, a credit card number format, an electronic mail address format, a phone number format, a gender format, a race format, and a healthcare data format.

In one embodiment, the obfuscated version of the identified sensitive information is selectively un-obfuscated by the computing device. In one embodiment, the updated content includes the obfuscated version of the identified sensitive information and un-obfuscated information.

In one embodiment, the computing device generates the obfuscated version of the identified sensitive information by at least one of anonymizing, encrypting, hashing, and masking the identified sensitive information within the received content. In one embodiment, the computing device is operatively coupled to a display device, and further includes display instructions that when executed on the computing device cause the computing device to, when the updated content is outputted, un-obfuscate the obfuscated version of the identified sensitive information within the outputted updated content and exhibit the output updated content with the un-obfuscated sensitive information on the display device. In one embodiment, the display instructions are executable by a predetermined subset of operators of the computing device. In still another embodiment, the processor of the computing device further executes audit instructions that cause the computing device to record at least one of a date, a time, and a respective one of the predetermined subset of operators that retrieved the updated content and was presented with the updated content exhibited on the display device.

In one embodiment, the predetermined confidence threshold is comprised of a plurality of confidence thresholds including two or more confidence thresholds defining an acceptable match between the plurality of data patterns indicative of sensitive information being found within the received content. In one embodiment, the two or more confidence thresholds defining the acceptable match include a first confidence threshold for which the processor further causes the computing device to automatically generate and to store a new one of the plurality of data patterns as a learned data pattern. In another embodiment, the two or more confidence thresholds defining the acceptable match include a second confidence threshold for which the processor further causes the computing device to automatically generate a proposed new one of the plurality of data patterns as a learned data pattern subject to review and approval.

In another aspect of the present disclosure, a method of obfuscating sensitive information within content includes receiving, by a processing device, content, determining a context of the received content, when the determined context is relevant for obfuscation, scanning the received content to identify information therein that matches, within the determined context, one of a plurality of data patterns indicative of the information being sensitive information, and assigning a confidence value to the identified sensitive information. When the scanned content includes sensitive information identified with the assigned confidence value above a predetermined confidence threshold, the method further includes generating an obfuscated version of the identified sensitive information within the received content, replacing the identified sensitive information with the obfuscated version of the identified sensitive information within the received content to form updated content, and outputting the updated content.

In one embodiment, the context includes at least one of a feature or a subject of the received content, a manner of use of the received content, and a determination of a user at least one of accessing, transmitting, and receiving the received content. In one embodiment, the subject is indicative of a feature of the received content and a relationship of the received content to one or more persons and entities. In one embodiment, the feature and the relationship of the received content is indicative of at least one of personally identifiable information, biometric information, financial information, health information, authentication credential information, encryption key and certificate information, and location information. In another embodiment, the manner of use of the received content is at least one of a confidential communication, a confidential storage of the information, a legal proceeding, an educational record, a governmental record, a pattern of behavior of an individual, and a relationship between two or more individuals. In one embodiment, the user of the information has a security level such that access to un-obfuscated information is unauthorized.

In one embodiment, the data patterns are each definable in one of a plurality of template formats. In one embodiment, the plurality of template formats includes user definable template formats. In another embodiment, the plurality of template formats includes template formats automatically defined by a computing device based upon a relationship of information within the received content. In one embodiment, the relationship of information includes at least one of a detected variation within the content from the template format and a learned data pattern derived from one or more machine-learning algorithms that draw inferences from patterns of data within the received content. In one embodiment, the obfuscated version of the identified sensitive information is selectively un-obfuscated for presentation to a user on a display device.

BRIEF DESCRIPTION OF THE DRAWINGS

Referring now to the Figures, which are exemplary embodiments, and wherein like elements are numbered alike.

DETAILED DESCRIPTION OF PREFERRED EMBODIMENTS

Figure 1:
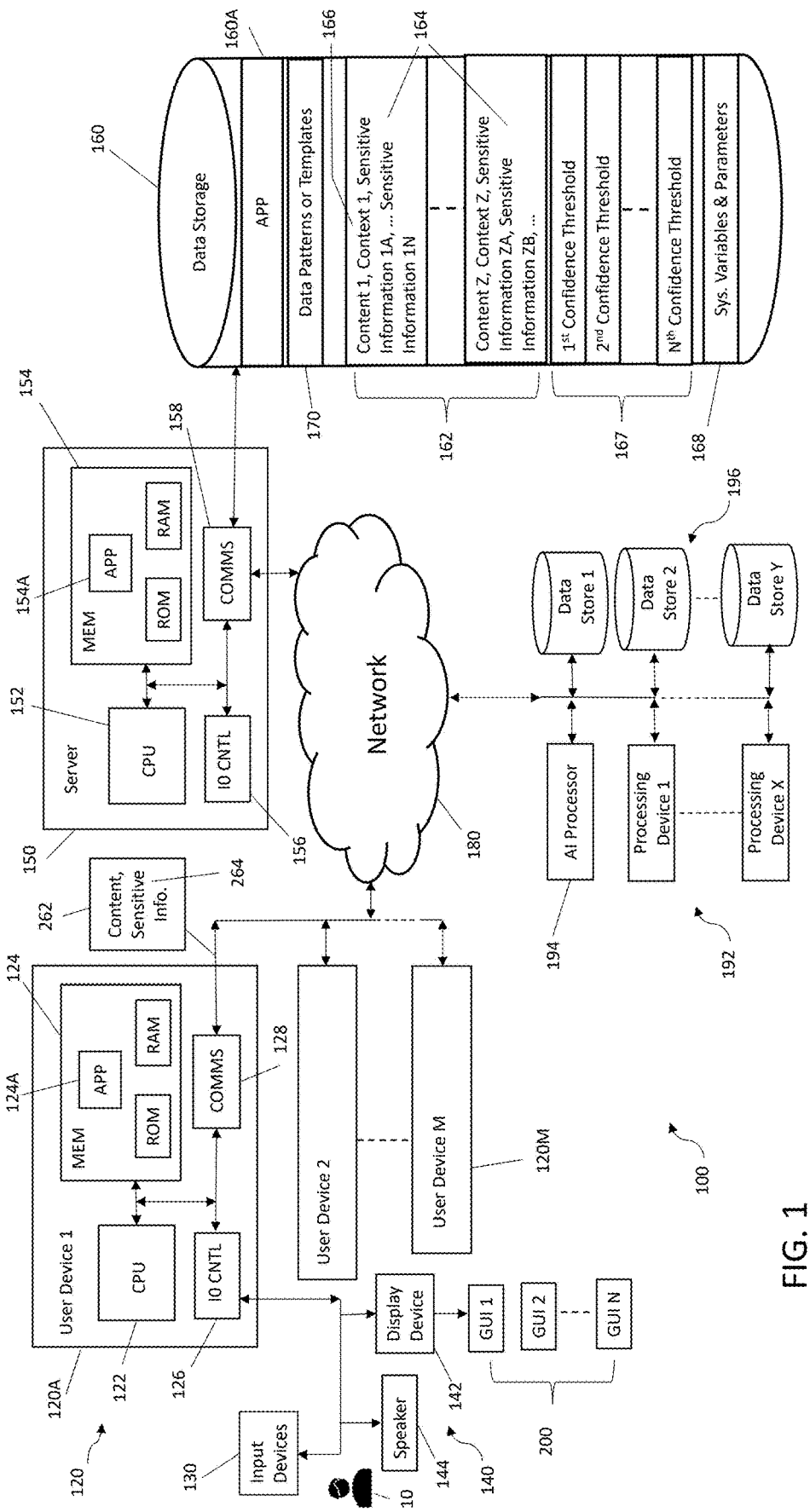
FIG. 1 is a schematic diagram of an exemplary data processing system, according to one embodiment of the present invention.

FIG. 1 depicts a simplified block diagram view of an exemplary data processing system 100 that identifies and obfuscates, fully or partially, sensitive information within content of the data processing system based upon a context of the content and data patterns within the content, according to one embodiment. The system 100 includes a plurality of client or user devices, shown generally at 120, including client/user devices 120A to 120M, operatively coupled to and in communication with a network 180. In one embodiment, each of the client/user devices 120 includes or is operatively coupled via the network 180 to one or more processors (CPU) 122, memory (e.g., internal memory (MEM) 124 including hard drives, ROM, RAM, and the like), and/or data storage (e.g., hard drives, optical storage devices, and the like) as is known in the art. In one embodiment, each of the client/user devices 120 includes or is operatively coupled to one or more input devices 130 and one or more output devices 140 via an input/output controller (IO CNTL) 126. In one embodiment, the input devices 130 include, for example, a keyboard, mouse, stylus, or like pointing device, buttons, wheels, touch pad, or touch screen portions of a display device, or input ports, and/or combinations thereof, for receiving and providing data and information, i.e., content, to the client/user device 120. In one embodiment, the output devices 140 include, for example, one or more display devices 142 integral with or operatively coupled to the client/user device 120 to exhibit visual output, a speaker 144 to provide audio output, and/or a printer (not shown) to provide printed output. In one embodiment, the visual and printed output includes documents, images, and other visual representations of the content (e.g., data and information) within the system 100. In one embodiment, the output devices exhibit one or more graphical user interfaces (GUIs, e.g., GUI 1 to GUI N) 200 that may be visually perceived by a user/operator 10 operating one of the client/user devices 120. It should also be appreciated that for clarity purposes, components (e.g., CPU, MEM, IO CNTL, input and output devices and the like) are depicted in FIG. 1 only with reference to User Device 1 120A but equally may correspond to one or more of the other client/user devices 120 (User Device 2 to User Device M). In one embodiment, the client/user devices 120 include, for example, a personal computer or workstation, or portable computer processing devices such as, for example, a personal digital assistant (PDA), iPAD™ device, tablet, laptop, mobile radio telephone, smartphone (e.g., Apple™ iPhone™ device, Google™ Android™ device, etc.), or the like. It should be appreciated that the designations Apple, iPhone, and iPad are trademarks of Apple Inc. of Cupertino, California. It should also be appreciated that the designations Google and Android are trademarks of Google LLC of Mountain View, California.

In one embodiment, the data processing system 100 and each of the client/user devices 120 may be operatively coupled to and in communication with, via the network 180, a server 150. In one embodiment, the server 150 includes one or more processors (CPU) 152, memory (e.g., internal memory (MEM) 154 including hard drives, ROM, RAM, and the like), an input/output controller (IO CNTL) 156 for receiving and outputting content (e.g., data and information) via input and output devices coupled thereto (not shown), and/or one or more data storage devices 160 (e.g., hard drives, optical storage devices, and the like) as is known in the art. In one embodiment, illustrated in FIG. 1, each of the client/user devices 120 and the server 150 include communication circuitry (COMMS) 128 and 158, respectively, such as a transceiver or network interface card (NIC), for operatively coupling the client/user devices 120 and the server 150 by wired or wireless communication connections to the network 180 such as, for example, a local area network (LAN), an intranet, extranet, or the Internet, and in some embodiments to a plurality of processing devices 192 including, for example, processing devices 1 to X and an artificial intelligence (AI) processor 194, and/or data storage devices 196, for example, data stores 1 to Y, also operatively coupled to and communicating with the network 180. As described in detail below, in one embodiment, the AI processor 194 assists in identifying data patterns within the content based upon predetermined data patterns or templates and/or can be trained to detect or discover new data patterns using machine-learning algorithms. It should be appreciated that, while not shown, the network 180 may include, for example, cell towers, routers, repeaters, ports, switches, and/or other network components that comprise the Internet and/or a cellular telephone network and/or Public Switched Telephone Network (PSTN), as is known in the art. It should also be appreciated that the network 180 may include or utilize, for example, components and/or resources in a "cloud" or virtual environment. It should also be appreciated that communication and transfer of data between devices coupled to the network 180 may occur through protocols operating at various Open Systems Interconnection (OSI) model layers including, for example, Transmission Control Protocol/Internet Protocol (TCP/IP) on the Transport and Internet layers and/or the Hypertext Transfer Protocol (HTTP) and interfaces such as, for example, socket Application Programming Interfaces (APIs) operating on the Application layer, as are known in the art.

In one embodiment, the client/user devices 120 and the server 150 cooperate to implement the data processing system 100 that identifies and obfuscates, fully or partially, sensitive information within content based upon a context of the content and data patterns within the content. In one aspect of the present disclosure, a nature or inherent feature of the content (e.g., data and information) itself and/or a subject of the content including, for example, a relationship of the content to one or more persons or entities described, a manner of use of content within the data processing system, and/or determination of a user accessing, transmitting, or receiving content within the system is used to determine the context of the content. It should be appreciated that while the terms "obfuscate" or "obfuscating" are used within the description of the present disclosure, the terms should be understood to generally cover any type of hiding, masking, obscuring, anonymizing, or otherwise making portions of content unidentifiable to unauthorized users within the data processing system 100. In one aspect of the data processing system 100, the client/user devices 120 and the server 150 execute a plurality of programmable instructions of a multifunctional software application or app (e.g., "APP") of the system 100, or portions or modules thereof, 124A, 154A, or 160A, stored in local memory 124, 154, or network memory 160, respectively, to implement the system 100 and features and/or functions thereof that identify and obfuscate sensitive information within the content based upon the context of the content and data patterns determined within the content. In one embodiment, users of the system 100 (e.g., the operators 10 operating the user devices 120) may be granted differing authorizations or permissions and/or levels thereof, to execute various ones of the features and/or functions of the system 100. For example, the authorizations or permissions may specify whether a user may be able to access, view, and/or manipulate, e.g., perform operations upon, sensitive information within the system 100, as described herein. In one embodiment, the content that is analyzed to identify and obfuscate, fully or partially, sensitive information therein is stored within memory devices such as, for example, content (not shown) stored in the internal memory (MEM) 124 and 154, respectively, of one or more of the client/user devices 120 or sever 150, or content 162 stored (e.g., content "at rest") and sensitive information 164 therein within the data storage device 160. In one embodiment, the content that is analyzed to identify and obfuscate, fully or partially, sensitive information therein is content 262 that is in process or being communicated (e.g., content "in motion") and sensitive information 264 therein within the data processing system 100, for example, in a document, file, or application being accessed by, transferred between, and/or executed on, one of the client/user devices, e.g., User Device 1, and the server 150. In one embodiment, various variables and parameters, shown generally at 168, that are used by the system 100, are stored in the data storage device 160.

It should be appreciated that as described herein sensitive information 164 and 264 within the content 162 and 262, respectively, includes personally identifiable information such as, for example, a person's name, relatives' names, residence address, current location (e.g., global positioning satellite (GPS) coordinates providing a precise geographic location on earth), telephone number, email address, governmental identification numbers such as a social security number, tax identification number, passport or visa number, driver's license number, information concerning a person's passport or visa including travel history and/or itineraries, nationality, gender, gender identity, sexual orientation, important personal dates such as birth date, wedding date, birth dates for children or other dependents, family, or relatives, biometric data including fingerprints, facial and voice recognition data, and the like. Sensitive information may also include educational information such as, for example, enrollment records, transcripts, grades, extra-curricular activities, awards, or achievements as well as disciplinary actions, and the like. Sensitive information also includes financial information such as, for example, bank account numbers, credit card numbers, details of financial transactions, credit history and scores or reports, assets and liabilities, and the like. Sensitive information may further include medical or health information such as medical records, patient identifiers, health conditions, test results, and treatments, health insurance information, and the like. Sensitive information may still further include authentication credentials and/or encryption keys or certificates such as, for example, usernames, passwords, security questions, application programming interface (API) key, and the like.

The inventors have recognized that many of the above-described categories of sensitive information have distinct characteristics such as, for example, distinct data types (e.g., alphabetic, numeric, alphanumeric, and the like), a length or size of data strings, and may be presented in distinct formats. These characteristics of certain categories of sensitive information permit identifying the information as sensitive information, whether or not the information is expressly identified by a field name or other label as being sensitive information within a data processing system. As such, in some embodiments, sensitive information is identifiable as matching one of a plurality of predetermined data patterns or templates 170 representing the distinct characteristics, e.g., data types, length or size of data strings, and formats, of certain categories of sensitive information. For example, exemplary types of sensitive information include a social security number that is typically expressed as a series of numeric values in the format "123-45-6789" and information including an important date, e.g., a date of birth is typically expressed, in the United States, as a series of numeric values in a month, day, year format as "12-34-4569" or in some countries outside the United States, in a day, month, year numeric format. In one embodiment, the plurality of predetermined data patterns or templates 170 are stored in the data storage device 160.

In one embodiment, one or more of the APPs 124A, 154A, 160A are executed to define and thus customize, one or more of the predetermined data patterns or templates 170 to changing needs. In one embodiment, the plurality of predetermined data patterns or templates 170 include data patterns or templates defined by the operators 10 operating the user devices 120, an administrator operating the server 150 or another data processing device operatively coupled thereto, and/or the AI processor 194 applying a predetermined data pattern or template to detect variations thereof within new content and/or to learn and/or to be trained to learn new data patterns or templates using, for example, machine-learning algorithms that draw inferences from patterns in the content. In one embodiment, the AI processor 194 is trained to analyze content and detect or learn new data patterns or templates using one or more techniques of, for example, supervised learning, unsupervised learning, semi-supervised learning, and reinforcement learning. In one embodiment, predetermined data patterns or templates are provided to the AI processor 194 (e.g., in a feedback loop) to train the processor to detect variations in the pattern. For example, a date may be expressed in one or more formats of numeric values in a month, day, year format (in the US), a day, month, year format (in some countries outside the United States) as outlined above, or in an alphanumeric format where, for example, a month of the year is expressed in alphabetic rather than numeric values (e.g., January, February, etc.). It should be appreciated that it is within the scope of the present disclosure to employ other methods of training or using the AI processor 194 to build data patterns or templates such as, for example, using linear regression, decision trees, k-means, principal component analysis, neural networks (e.g., callable neural networks (CNNs) and recurrent neural networks (RNNs) and the like), and/or other known machine-learning algorithms.

Figure 2:
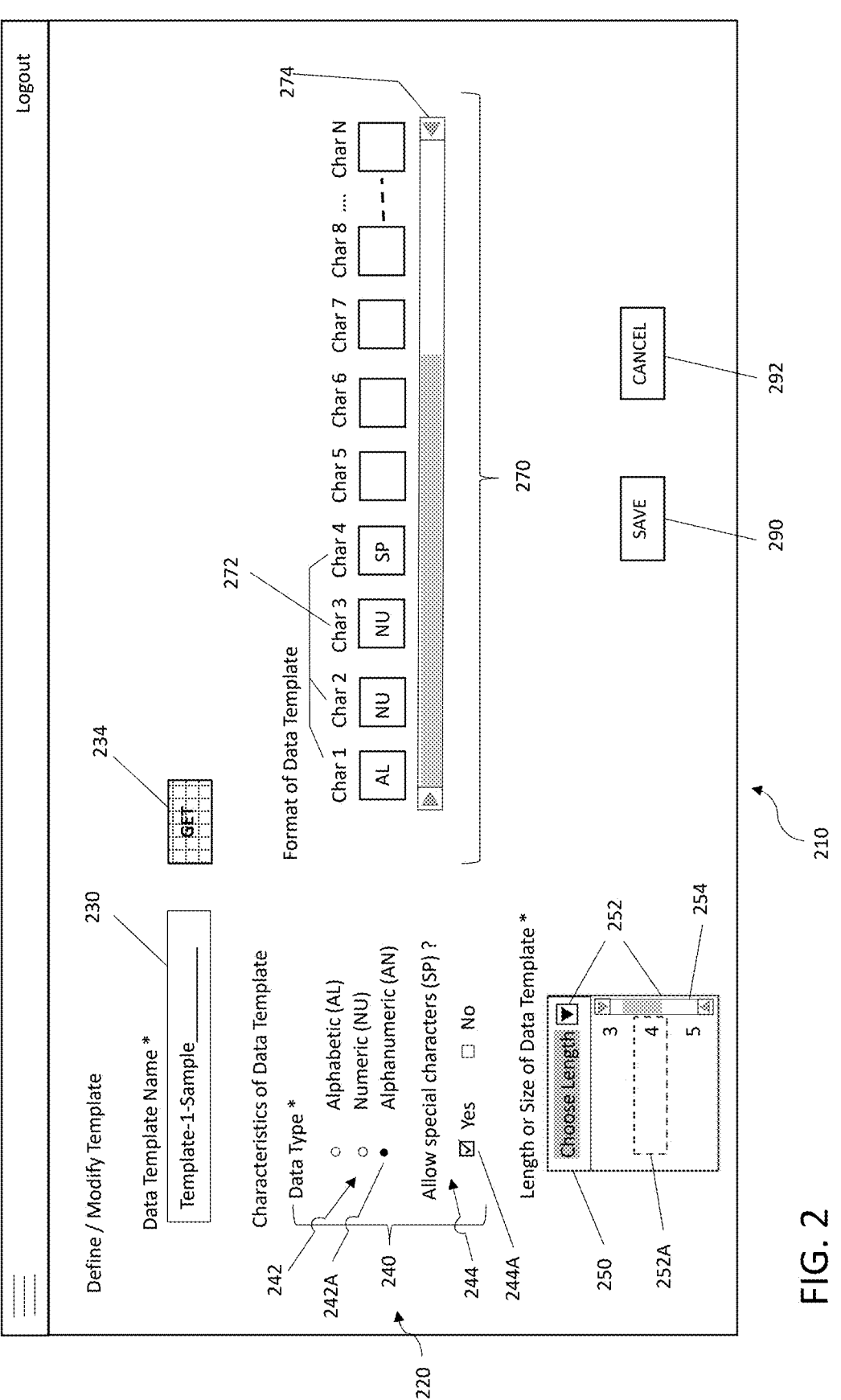
FIG. 2 is a graphical user interface depicting an exemplary Add or Modify Template page where a user views, adds, and/or modifies data patterns or templates for locating sensitive information within the data processing system of FIG. 1, according to one embodiment of the present invention.

As noted above, in one embodiment the users of the system 100 (e.g., operators 10 of one of the user devices 120 or an administrator operating the server 150) execute one or more of the APPs 124A, 154A, 160A to define and/or update, via one or more of the GUIs 200, one or more of the data patterns or templates 170. For example, FIG. 2 depicts a Define/Modify Template GUI 210, in accordance with one embodiment. As shown in FIG. 2, the Define/Modify Template GUI 210 includes one or more regions, shown generally at 220, that exhibit labels representing fields 230, 240, 250, and 270 to define a new one or to review and/or modify (e.g., manually change) an existing one of the data patterns or templates 170, stored in the data storage device 160. In one embodiment, in the Define/Modify Template GUI 210 the user may enter a value in a Data Template Name field 230 (e.g., a value "Template-1-Sample" is shown in FIG. 2). Upon entry, one of the APPs 124A, 154A, 160A initiates a lookup operation (e.g., search of templates 170 within the data storage device 160) to determine whether the entered value corresponds to an existing data pattern or template 170. If a match is found, a GET control button 234 (currently illustrated as being disabled or "grayed out") is activated to allow the user to retrieve the existing template 170 for review and possible modification. If the user does not wish to access the identified, existing template 170, the user may modify the value in the Data Template Name field 230 to initiate a new lookup operation. When activated and the GET control button 234 is selected, one of the APPs 124A, 154A, 160A retrieves the existing data pattern or template 170 from, for example, the data storage device 160 and exhibits the template 170 and its corresponding values within one or more of the fields 240, 250, and optionally 270, on the Define/Modify Template GUI 210. When a match is not found during the lookup operation, the GET control button 234 remains disabled, and the user may proceed to define a new one of the data pattern or templates 170 to be identified by the value inputted in the Data Template Name field 230. It should be appreciated that in one embodiment, one or more of the values of the selected data patterns or templates 170 are "required" entries, e.g., entries that are required to have a non-blank or non-null value. In one embodiment, these required entries are indicated on the Define/Modify Template GUI 210 by an asterisk symbol ("*") following the label indicating the name of the field 230, 240, and 250. To save the new and/or modified field values, the user selects a "Save" control button 290. Alternatively, the user ends the edit operation by selecting a "Cancel" control button 292. In one embodiment, selecting the Save control button 290 or the Cancel control button 292 closes the Define/Modify Template GUI 210.

As shown in FIG. 2, the Define/Modify Template GUI 210 includes, as a required entry, the Data Template Name field 230 whereby the user identifies a new or existing one of the data patterns or templates 270. The Define/Modify Template GUI 210 also includes fields 240, 250 and 270 for defining and/or reviewing and modifying characteristic of the new or the existing one of the data patterns or templates 170. For example, within a required entry, the user inputs the data type of the template 170 by defining or editing the Data Type field 240. In one embodiment, the Data Type field 240 includes two or more radio button controls 242 for defining or editing options of the data type of the template 170 such as, for example, whether alphabetic, numeric, or alphanumeric input is required. As should be appreciated, the radio button controls 242 represent mutually exclusive choices of alphabetic, numeric, or alphanumeric input values, whereby a selection of an "Alphanumeric (AN)" button 242A (shown as selected for the "Template-1-Sample" template 170) disables or deactivates the other options for data type values of "Alphabetic (AL)" and "Numeric (NU)". In one embodiment, when either of the Alphabetic (AL) button or the Alphanumeric (AN) button 242A are selected, two checkbox controls are enabled, shown generally at 244, and identified by a general label "Allow special characters (SP)?" and individual labels "Yes" and "No". It should be appreciated that the checkbox radio button controls 244 represent mutually exclusive choices of yes and no, whereby a selection of "Yes" checkbox 244A (shown as selected for the "Template-1-Sample" template 170) disables or deactivates the other option (e.g., the "No" checkbox) for data type allowed to include special characters. In one embodiment, special characters include, but are not limited to, a tilde ("~"), an accent or open quote ("'"), an exclamation mark ("!"), an ampersand ("@"), and a number sign ("#"), a dollar sign ("$"), a percent sign ("%"), and the like. In one embodiment, the Define/Modify Template GUI 210 provides for a definition of a length or size (e.g., number of characters) of the template 170. For example, in one embodiment as shown in FIG. 2, a numeric value is enterable at a "Length or Size of Data Template" field 250 or selectable via a dropdown menu control element 252 which lists exemplary lengths/sizes as options that may be selected. For example, the dropdown menu control element 252 includes, in one embodiment, numeric entries from "1" to a predetermined maximum field length or size item (e.g., an item "4" is depicted as selected in FIG. 2). As an item "4" is depicted as being selected at 252A, a length of four (4) characters is defined as the length of the "Template-1-Sample" template 170. In one embodiment, the user may optionally define a format of the data pattern or template 170 in the Format of Data Template field 270. For example, in one embodiment shown in FIG. 2, for the alphanumeric data type a user may enter, in a character-by-character manner (e.g., Char 1 to Char N, as shown at 272) for each character within the "Length or Size of Data Template" field 250, a Data Type code (e.g., the aforementioned code values of "AL" for the "Alphabetic (AL)" data type, "NU" for the "Numeric (NU)" data type, and "AN" for the "Alphanumeric (AN)" data type) to define a format for the data pattern or template 170 (e.g., the four (4) characters of the "Template-1-Sample" template 170). As shown in FIG. 2, the "Template-1-Sample" template 170 has a length of four (4) characters as indicated in the "Length or Size of Data Template" field 250 and a format of the four (4) characters as indicated in the "Format of Data Template" field 270 and character fields 272 of a first alphabetic character, as indicated by an input code value of "AL", followed by a second numeric character and a third numeric character as indicated by two input code values, each of "NU," and a fourth special character as indicated by an input code value of "SP." Accordingly, an acceptable data entry matching this format of data template Template-1-Sample is, for example, a value "A01 #". It should be appreciated that various combinations of character data formats may be defined within the "Format of Data Template" field 270 and the character fields 272. As shown in FIG. 2, one or more scroll bar elements can be provided to visually exhibit additional values beyond what is exhibited within the borders of one or more fields, for example, scroll bar elements 254 and 274 exhibit additional values and input fields for the "Length or Size of Data Template" field 250 and the "Format of Data Template" field 270, respectively. It should be appreciated that while specific textual labels and controls are illustrated in FIG. 2, it is within the scope of the present disclosure that the functionality described above, and other functionality, may be invoked with other types of navigation or control elements such as, for example, icons, menus, dropdown menus, radio buttons, checkboxes, lists, or the like.

It should be appreciated that one or more of the APPs 124A, 154A, 160A are executed to search the stored content 162 within, for example, data storage devices, databases, or content in stored documents or files (e.g., content "at rest") and/or the in-process content 262 within, for example, documents or files being transmitted, data streams, data queues, or application memory (e.g., content "in motion") and to identify or match one or more of the predetermined data patterns or templates 170 to identify sensitive information 164 and 264 within the content 162 and/or 262. In one embodiment, the identifying or matching process may be performed as a character-by-character comparison of portions of the content 162 and 262 to the predetermined data patterns or templates 170 to identify equivalent characteristics (e.g., data types, length or size of data strings, and formats). In one embodiment, the predetermined data patterns or templates 170 are used to determine and assign a confidence level, for example, a percentage or statistical classification of relevance, of the match obtained within the identifying or matching process.

For example, an exact match in the characteristics of the predetermined data patterns or templates 170 as compared to the portion of the content 162 and 262 searched yields a relatively high percentage, e.g., a one hundred percent (100%) value as the confidence level, while a less than exact match, but some percentage of match, in the characteristics of the predetermined data patterns or templates 170 as compared to the portion of the content 162 and 262 searched yields a lower, but non-zero percentage, e.g., seventy-five percent (75%) value as the confidence level, and still further no matching characteristics yields a zero percentage (0%) value as the confidence level. In one embodiment, one or more confidence thresholds are established within the system 100. For example, in one embodiment, a first confidence threshold is established at or above which, for example, an acceptable match is found with a high degree of confidence (e.g., a confidence level of between about ninety-five to one hundred percent (95% to 100%)) when comparing the predetermined data patterns or templates 170 to the portion of the content 162 and 262 and which may be indicative of either an exact match or a near exact match with only minor variation from the patterns or templates, a second confidence threshold is established at or above which an acceptable match is found with a lesser degree of confidence (e.g., a confidence level of between about eighty-five to about ninety-four percent (85% to 94%)) when comparing the predetermined data patterns or templates 170 to the portion of the content 162 and 262 and which may be indicative of a match with more variation from the patterns or templates 170, and a third confidence threshold is established at or above which a still acceptable match is found with a further lesser degree of confidence (e.g., a confidence level of between about seventy-five to about eighty-four percent (75% to 84%)) when comparing the predetermined data patterns or templates 170 to the portion of the content 162 and 262 and which may be indicative of a match with still more variation from the patterns or templates 170, and below which (and above 0%) no match is determined to be found within the identifying or matching process (e.g., a confidence level of below seventy-five percent (less than 75%)). In one embodiment, one of the users of the system 100 (e.g., one of the operators 10 of one of the user devices 120 or an administrator operating the server 150) execute one or more of the APPs 124A, 154A, 160A to define values, via one or more of the GUIs 200, of the one or more confidence thresholds, shown generally at 167 and stored within the data storage device 160.

As may be appreciated from the exemplary lists of sensitive information provided above, the context of the sensitive information may be defined by the nature or inherent features of the information itself or the subject of the content including, for example, the relationship of the information to persons or entities. Alternatively, the context of the sensitive information may be defined by the manner or way that the information is used or processed within the data processing system 100 apart from and/or in addition to any data pattern within the content. For example, it is within the scope of the present disclosure for sensitive information to include proprietary business information such as confidential procedures, plans, reports, and strategies, customer, supplier, key employee, or vendor lists, inventory and sales information and transactions, contractual obligations (e.g., insurance policy information including covered assets, claims, and reports related thereto), trade secrets, non-public intellectual property such as proprietary algorithms, formulae, procedures, processes, or techniques, and the like, as well as business rules defining use thereof within and outside an organization. Sensitive information may also include certain communications such as, for example, content of electronic mail messages, chat logs, and like messages which include confidential information, as well as certain social media information such as, for example, user profile information, private messages, and private posts, certain social media network connections, history of or patterns of relationships, and the like. Sensitive information may further include information that can be leveraged to determine user behavior, interests, or patterns of behavior and interests such as internet browsing history, purchase history, and the like. Sensitive information may still further include information used in legal proceedings such as, for example, legal documents, non-public records of court or other administrative proceedings, privileged information between participants of such proceedings, and the like. Sensitive information may even further include information used within governmental operations such as, for example, classified information, information accessible only with certain security clearances, lists of certain government offices, officials, and employee records, and the like. Still further the manner or way that the information is used may include use of content within a programming development environment where, for example, "production data" (e.g., "real" data used in client/customer/consumer-facing applications), which includes sensitive information, is used in a testing or development environment. As should be appreciated, the use of content in the testing or development environment should not include any sensitive information contained within the content.

It should also be appreciated that information may become sensitive information based upon the manner, way, or context that the information is used, integrated, or aggregated with other information over time and multiple integrations or aggregations. For example, information may initially be considered non-sensitive based on, for example, its nature or inherent features or subject, however the information may become sensitive when integrated, aggregated, or used with other information or when used in a certain manner, or when accessed by or transmitted to certain users of the data processing system. Examples of the integration or aggregation of non-sensitive or less-sensitive information that may become more sensitive information include, e.g., a particular driver's information, his/her vehicle information, and current location information (e.g., GPS coordinates) at a fixed time, which may not individually be sensitive information but when accumulated provide an exact location of an individual at a precise time and therefore may give rise to privacy or other concerns that make the accumulated information sensitive information. Other examples of integrated or aggregated information giving rise to sensitive information include, e.g., employee information and work habits that may provide sensitive productivity information or predictive Human Resources data; supply chain data including suppliers, their inventory, pending orders, and fulfillment details that may provide sensitive information regarding the supply chain and/or profitability of a particular supplier and/or sensitive market research information; medical records, insurance claims, and prescription information for an individual may provide personal healthcare information on the individual and/or his/her medical condition and whether the condition is temporary or chronic; and customer information that may define sales by factors such as geographic area, gender, race, and other indications of buying customer habits.

In one aspect of the present disclosure, this manner of use, integration, and/or aggregation of information and/or determination of a user accessing, transmitting, or receiving information also defines (in addition to the nature or inherent feature of the content itself and/or the subject of the content) the context of the content (e.g., data and information). In one embodiment, the context of the content is indicated by a context type field or designation 166 maintained within the content 162 and evaluated by, for example, the APPs 124A, 154A, 160A executing on the user devices 120 or the server 150 to identify the context of the content being processed. In one embodiment the APPs 124A, 154A, 160A determine the context of the content, and therefore may populate the context type field 166, based upon the way that the sensitive information is used or presented. For example, if the content is used within an employee's employment record, a person's health or medical record, a business contract, an insurance policy, or account record, a claim for loss or damage to a policy holder's assets, and the like, the APPs 124A, 154A, 160A may determine that this manner of use (e.g., determined context) indicates that the information is sensitive information, which should be obfuscated, fully or partially, when the record is stored or prior to being exhibited on a display device or transmitted within or outside a company. In such cases, the APPs 124A, 154A, 160A define the context type field 166 to identify the information as sensitive information. As noted above, context defining certain proprietary business information, information within certain communications, certain social media information, information regarding user behavior, interests, or patterns of behavior and interests, information used in legal proceedings, and information used in certain governmental operations, may be identified as sensitive information. As also noted above, one or more users 10 of the data processing system 100 may have different levels of access authority or privileges to access, review, and/or modify sensitive information. Accordingly, in one embodiment, the APPs 124A, 154A, 160A may use the context type field 166 to identify or define a minimum level of access authority or privilege required to access, review, for example, in an un-obfuscated manner, and/or modify the sensitive information within content having the sensitive information therein. For example, users within a common business team may have a similar access authority or privilege, and therefore may share content without sensitive information therein being obfuscated. However, if the content is transmitted or shared with a user or other third party having a lesser access authority, then in accordance with the present disclosure, the sensitive information with the content may be partially or fully obfuscated prior to the content being transmitted or shared with that user or other third party having the lesser access authority.

Figure 3A:
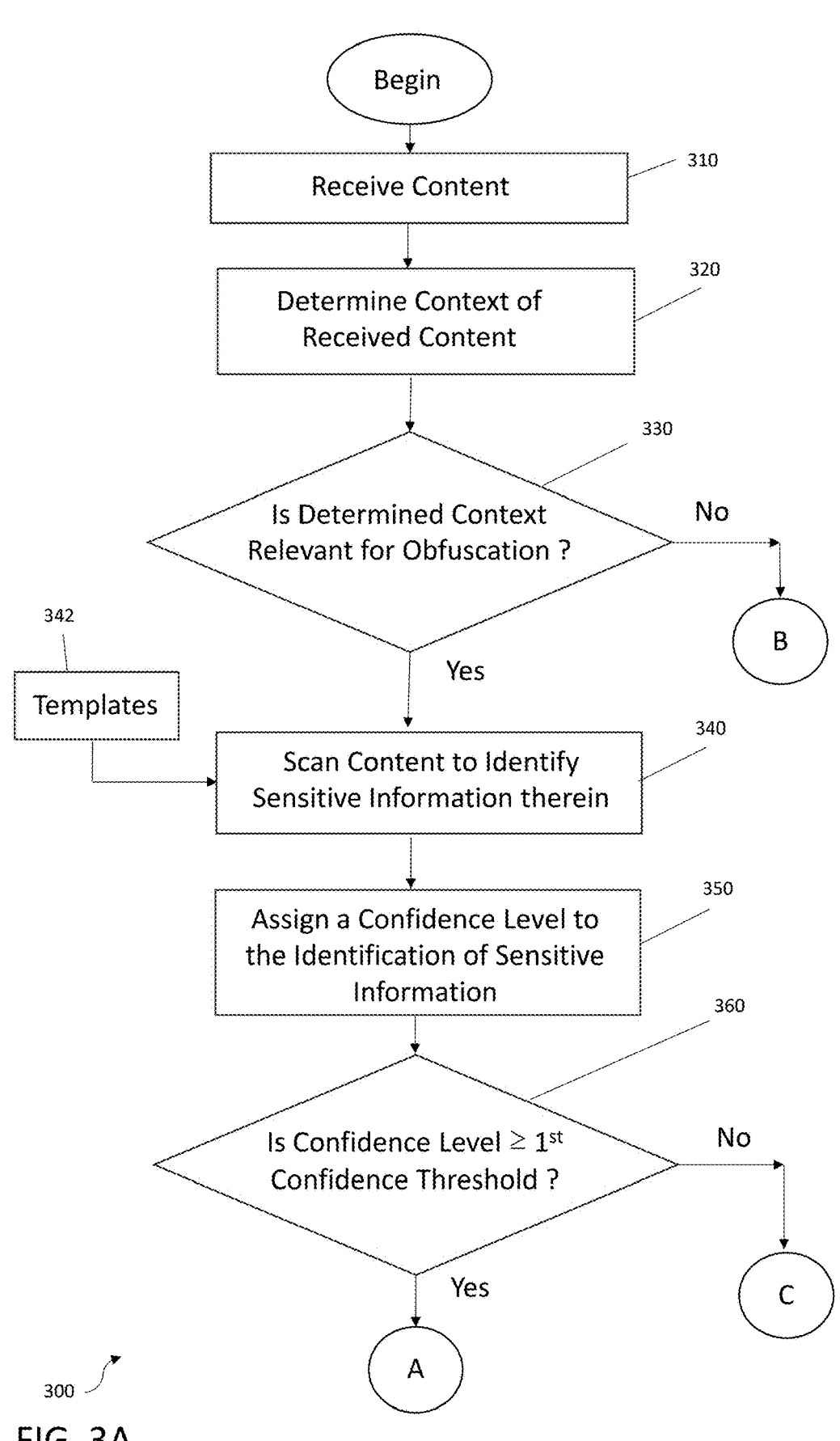
FIGS. 3A, 3B, and 3C are a flow diagram of a method, executed by the data processing system of FIG. 1, for identifying and obfuscating sensitive information within content based upon a context of the content and data patterns within the content, according to embodiments of the present invention.
Figure 3B:
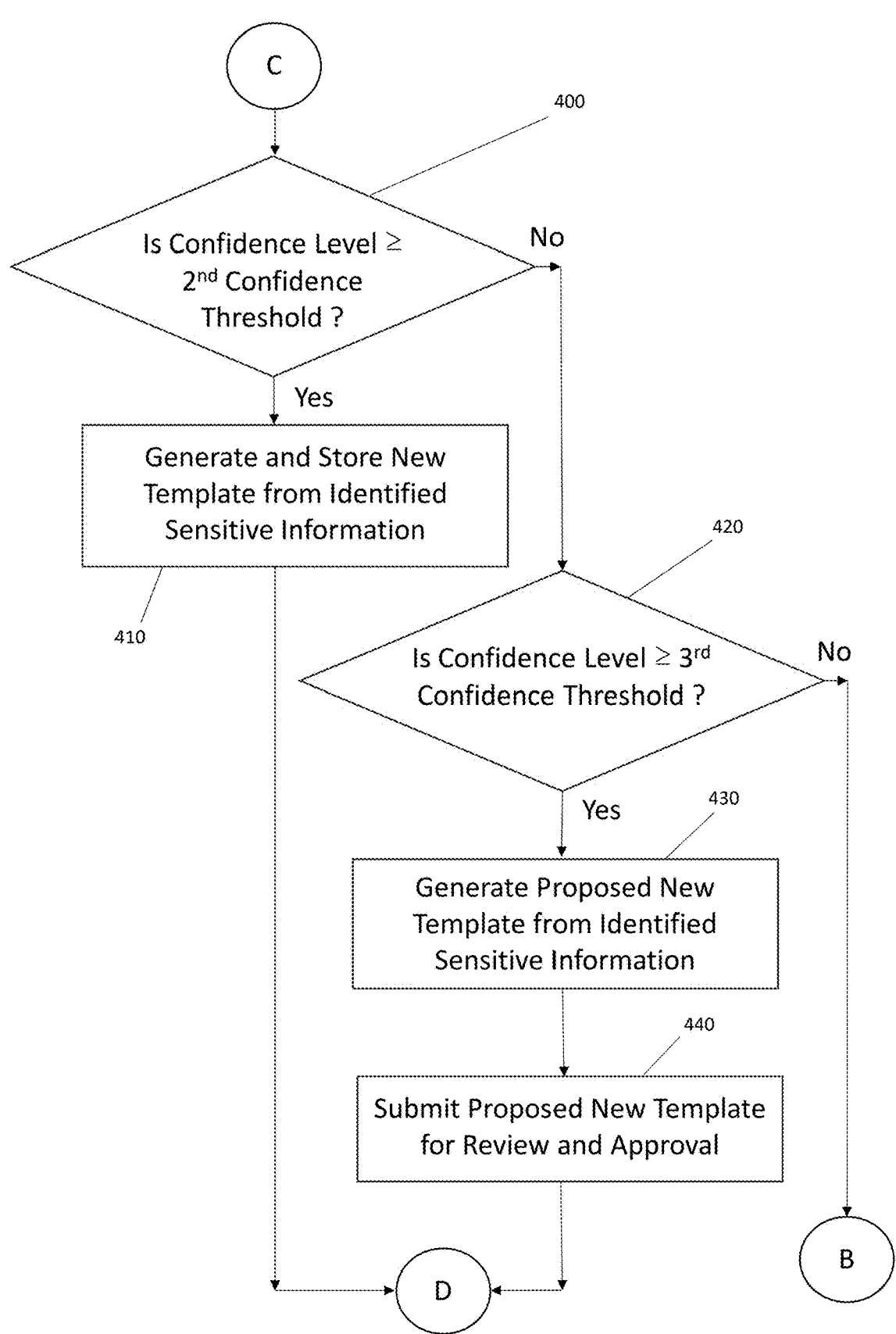
Figure 3C:
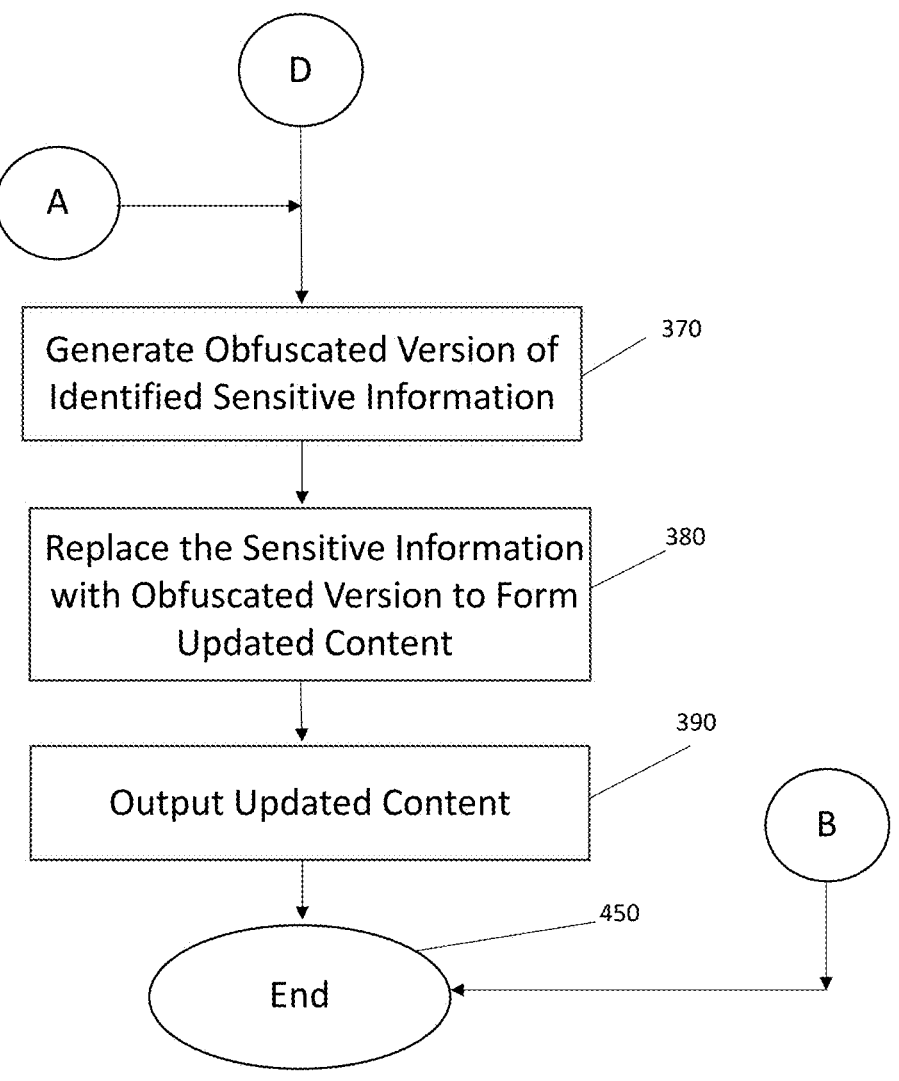

As described herein with reference to FIGS. 3A, 3B, and 3C, the APP 124A, 154A, 160A executes features and/or functions 300 to receive content, at Step 310, based on a request to retrieve the content, for example, from a data storage device (e.g., content 162 from data storage device 160), or when receiving a message including the content or executing an application utilizing the content (e.g., content 262). At Step 320, the APP 124A, 154A, 160A determines the context of the received content. For example, the APP 124A, 154A, 160A evaluates the context type field 166 of the content to determine whether the information therein is sensitive information, or if the context type field 166 is not utilized or includes a "blank" or "null" value, the APP 124A, 154A, 160A evaluates the manner that the content is being used (e.g., action to be performed) and/or the access authority or privileges of the user requesting and/or receiving content to determine the context. For example, in one embodiment, the content 162 is stored, e.g., in data storage device 160, in an un-obfuscated manner, and only when a request to access and retrieve the content 162 is received does the APP 124A, 154A, 106A execute to evaluate the content 162 and context of use to determine whether the content 162 and the sensitive information 164 therein should be obfuscated, partially or fully. With the context determined, the APP 124A, 154A, 160A continues execution to, at Step 330, determine whether the determined context is relevant for obfuscation. For example, the APP 124A, 154A, 160A evaluates the nature or inherent features of the content, the subject of the content, the manner of use of content and/or the user accessing, transmitting, or receiving content to determine whether it is appropriate to obfuscate sensitive information, if any exists, within the received content, prior to completing a requested action involving the content. If the APP 124A, 154A, 160A determines that the context is not relevant for obfuscation, execution by the APP 124A, 154A, 160A proceeds along a "No" path from Step 330 to end or terminate processing at a Step 450 of FIG. 3C, following a connector labeled "B" from FIG. 3A to 3C. If the APP 124A, 154A, 160A determines that the context is relevant for obfuscation, execution proceeds along a "Yes" path from Step 330 to Step 340 of FIG. 3A.

At Step 340, execution by the APP 124A, 154A, 160A continues to scan the received content to identify any sensitive information therein. In one embodiment, the scanning step includes comparing the content to one or more of the data patterns or templates 170 that are provided at Step 342. The comparison may be performed by the APP 124A, 154A, 160A on a character-by-character basis of characters of the one or more of the templates 170 to the characters within the received content. If a match is found by the comparison performed at Step 340, the APP 124A, 154A, 160A assigns, at Step 350, a confidence level related to each of the comparisons made at Step 340. At Step 360, the assigned confidence level for each of the matches made is compared to a first one of, for example, a plurality of predetermined confidence thresholds (e.g., the first one of the plurality of confidence thresholds 167 retrieved from storage in the data storage device 160). If at Step 360, the assigned confidence level for one or more of the comparisons made at Step 350 indicates that an acceptable match was found, e.g., the assigned confidence level is at or above the first one of the plurality of confidence thresholds 167 of, e.g., between about ninety-five to one hundred percent (95% to 100%), execution by the APP 124A, 154A, 160A proceeds along a "Yes" path from Step 360 to a Step 370 in FIG. 3C, following the connector labeled "A" from FIG. 3A to FIG. 3C.

Referring now to FIG. 3C, at Step 370, the APP 124A, 154A, 160A evaluates each of the comparisons made that yielded an acceptable match and generates an obfuscated version of the identified sensitive information. In one embodiment, the obfuscated version includes at least one of a partial or a full obfuscation of characters of the identified sensitive information. For example, in one embodiment, a portion of the identified sensitive information may be exhibited (e.g., not obfuscating a last four (4) characters of an account number or social security number) so that some indication of the sensitive information is presented to allow for the verification or to confirm the accuracy thereof. In one embodiment, the degree of obfuscation, e.g., full or partial, is determined by the APPs 124A, 154A, 160A based upon user access authority or privilege. In another embodiment, the degree of obfuscation, e.g., full or partial, is determined by the APPs 124A, 154A, 160A based upon its evaluation of the context type field 166 corresponding to each of the identified content and the sensitive information therein. Once the obfuscated version is generated by the APPs 124A, 154A, 160A at Step 370, its execution proceeds to Step 380 where the sensitive information 164 and 264 within the content 162 and 262 is replaced with the obfuscated version of the content to form updated content. Execution then proceeds from Step 380 to Step 390 where the updated content is outputted, for example, exhibited on the display device 142 to a user that requested the content, or attached to the message being sent by the user, or provided to the application utilizing the content. Once output at Step 390, execution of the APPs 124A, 154A, 160A proceeds from Step 390 to Step 450 where execution ends or terminates.

Referring again to Step 360 of FIG. 3A, if the assigned confidence level of all the comparisons made at Step 350 indicates no match or less than a preferred degree of match (e.g., confidence level below the first one of the plurality of confidence thresholds 167), execution by the APP 124A, 154A, 160A proceeds along a "No" path from Step 360 to a Step 400 in FIG. 3B, following the connector labeled "C" from FIG. 3A to FIG. 3B. At Step 400 of FIG. 3B, the assigned confidence level for each of the matches made is compared to a second one of, for example, the plurality of predetermined confidence thresholds (e.g., the second one of the plurality of confidence thresholds 167 retrieved from storage in the data storage device 160). If at Step 400, the assigned confidence level for one or more of the comparisons made at Step 350 indicates that a still acceptable match was found, e.g., a match with some variation from the data patterns or templates 170 and received content such that the assigned confidence level is at or above the second one of the plurality of confidence thresholds 167 of, e.g., between about eighty-five to about ninety-four percent (85% to 94%)), execution by the APP 124A, 154A, 160A proceeds along a "Yes" path from Step 400 to a Step 410 of FIG. 3B. At Step 410, the APP 124A, 154A, 160A automatically generates and stores a new one of the data patterns or templates 170 in the data storage device 160 based upon the match (e.g., the character-by-character comparison of characters of the one or more of the templates 170 to the characters within the received content) including some variation such that the variation in the received content as compared to the previously stored data patterns or templates 170 is retained as a new, "learned" data pattern or template. Once the new data pattern or template is stored, execution by the APP 124A, 154A, 160A continues processing and proceeds from Step 410 to Step 370 of FIG. 3C, following a connector labeled "D" from Step 410 of FIG. 3B to Step 370 of FIG. 3C. As noted above, at Steps 370, 380, and 390, an obfuscated version of the received content is generated by the APPs 124A, 154A, 160A (Step 370), the sensitive information 164, 264 within the received content 162, 262 is replaced with the obfuscated version forming the updated content (Step 380), and the updated content is outputted (Step 390), with execution of the APPs 124A, 154A, 160A ending or terminating at Step 450.

Referring again to Step 400 of FIG. 3B, if the assigned confidence level of all the comparisons made at Step 350 indicates no match or less than the preferred, second degree or level of confidence in the match (e.g., confidence level below the second one of the plurality of confidence thresholds 167), execution by the APP 124A, 154A, 160A proceeds along a "No" path from Step 400 to a Step 420 in FIG. 3B. At Step 420, the assigned confidence level for each of the matches made is compared to a third one of, for example, the plurality of predetermined confidence thresholds (e.g., the third one of the plurality of confidence thresholds 167 retrieved from storage in the data storage device 160). If at Step 420, the assigned confidence level for one or more of the comparisons made at Step 350 indicates that a still acceptable match was found, e.g., a match with some further variation from the data patterns or templates 170 and received content such that the assigned confidence level is at or above the third one of the plurality of confidence thresholds 167 of, e.g., between about seventy-five to about eighty-four percent (75% to 84%)), execution by the APP 124A, 154A, 160A proceeds along a "Yes" path from Step 420 to a Step 430 of FIG. 3B. At Step 430, the APP 124A, 154A, 160A automatically generates a proposed new one of the data patterns or templates 170 based upon the match (e.g., once again, the character-by-character comparison of characters of the one or more of the templates 170 to the characters within the received content) including some further variation such that the further variation in the received content as compared to the previously stored data patterns or templates 170 may be considered as a potentially new, "learned" data pattern or template. Execution by the APP 124A, 154A, 160A proceeds from Step 430 to Step 440 where the proposed new data pattern or template is submitted to, for example, an administrator of the data processing system 100 for review and approval, with or without modification, as a new one of the data patterns or templates 170, or is rejected. Once the proposed new data pattern or template is submitted for review, execution by the APP 124A, 154A, 160A continues processing and proceeds from Step 440 of FIG. 3B to Step 370 of FIG. 3C, following a connector labeled "D" from Step 440 of FIG. 3B to Step 370 of FIG. 3C. As noted above, at Steps 370, 380, and 390, an obfuscated version of the received content is generated by the APPs 124A, 154A, 160A (Step 370), the sensitive information 164, 264 within the received content 162, 262 is replaced with the obfuscated version forming the updated content (Step 380), and the updated content is outputted (Step 390), with execution of the APPs 124A, 154A, 160A ending or terminating at Step 450.

Referring again to Step 420 of FIG. 3B, if the APP 124A, 154A, 160A determines that the assigned confidence level of all the comparisons made at Step 350 indicates that no match or less than a preferred match is found (e.g., a match below each of the first, the second, and the third ones of the plurality of confidence thresholds 167), execution by the APP 124A, 154A, 160A proceeds along a "No" path from Step 420 to end or terminate processing at a Step 450 of FIG. 3C, following a connector labeled "B" from FIG. 3B to 3C. It should be appreciated that while not shown in the process flow 300 of FIGS. 3A, 3B, and 3C, in one embodiment, the updated content (e.g., content 162 and 262 with sensitive information 164 and 264 therein, obfuscated) may be stored, for example, in the data storage device 160, for later access in its obfuscated format.

It should be appreciated that the phraseology and the terminology used in the description of the various embodiments described herein should be given their broadest interpretation and meaning as the purpose is for describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, and equivalents thereof, and do not preclude the presence or addition of one or more other features, integers, steps, operations, elements, components, groups and/or equivalents thereof. It should also be appreciated that the term "computer program product" includes logic presented by computer code and instructions embodied in or on the computer program product that is executed and executable by one or more computing devices to implement and/or perform functionality or operations as described herein.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer program product comprising a non-transitory computer readable storage medium having a computer readable program stored therein, wherein the computer readable program, when executed on a computing device, causes the computing device to operate to:

receive content;

determine a context of the received content, wherein the computing device is configured to determine the context by a subject of the received content and a manner of use of the received content by the computing device including an action to be performed with the received content unrelated to whether the received content is obfuscated when output;

wherein when the determined context of the received content is relevant for obfuscation, scan the received content to identify information therein that matches, within the determined context, one of a plurality of data patterns indicative of the information being sensitive information;

assign a confidence value to the identifying of sensitive information; and wherein when the scanned content includes sensitive information identified with the assigned confidence value at or above one of a plurality of predetermined confidence thresholds defining an acceptable match, the computer readable program executes to cause the computing device to:

generate an obfuscated version of the identified sensitive information within the received content;

replace the identified sensitive information with the obfuscated version of the identified sensitive information within the received content to form updated content; and output the updated content;

wherein the plurality of predetermined confidence thresholds defining the acceptable match include a first confidence threshold and a second confidence threshold below the first confidence threshold, wherein when the assigned confidence value is at or above the first confidence threshold the computer readable program further executes to cause the computing device to automatically generate and to store a new one of the plurality of data patterns as one of a plurality of learned data patterns; and wherein when the assigned confidence value is at or above the second confidence threshold and below the first confidence threshold, the computer readable program further executes to cause the computing device to automatically generate a proposed new one of the plurality of data patterns as one of the plurality of learned data patterns subject to review and approval.

2. The computer program product of claim 1, wherein the context further includes a feature of the received content.

3. The computer program product of claim 2, wherein the feature is indicative of a relationship of the received content to one or more persons and entities.

4. The computer program product of claim 3, wherein the feature and the relationship of the received content are indicative of at least one of personally identifiable information, biometric information, financial information, health information, authentication credential information, encryption key and certificate information, or location information.

5. The computer program product of claim 1, wherein the manner of use of the received content by the computing device that defines the context is the action including at least one of use within a confidential communication, within a confidential storage of the information, within a legal proceeding, within an educational record, within a governmental record, use of business systems data including the sensitive information in a programming development environment, or use to determine a pattern of behavior of an individual operating the computer device.

6. The computer program product of claim 1, wherein the computer readable program further causes the computing device to operate to store a value in a context type field to identify the determined context of the content being processed by the computing device.

7. The computer program product of claim 1, wherein the plurality of data patterns is each definable in one of a plurality of template formats.

8. The computer program product of claim 7, wherein the plurality of template formats includes user definable template formats.

9. The computer program product of claim 7, wherein the plurality of template formats includes template formats automatically defined by the computing device based upon a relationship of information within the received content.

10. The computer program product of claim 9, wherein the relationship of information includes at least one of a detected variation within the content from the template format or a learned data pattern derived from one or more machine-learning algorithms that draw inferences from patterns of data within the received content.

11. The computer program product of claim 1, wherein the plurality of data patterns includes at least one of a date format, an address format, a social security number format, a financial account number format, an insurance policy number format, a credit card number format, an electronic mail address format, a phone number format, a gender format, a race format, or a healthcare data format.

12. The computer program product of claim 1, wherein the obfuscated version of the identified sensitive information is selectively un-obfuscated by the computing device.

13. The computer program product of claim 1, wherein the updated content includes the obfuscated version of the identified sensitive information and un-obfuscated information.

14. The computer program product of claim 1, wherein the computing device generates the obfuscated version of the identified sensitive information by at least one of anonymizing, encrypting, hashing, or masking the identified sensitive information within the received content.

15. The computer program product of claim 1, wherein the computing device is operatively coupled to a display device, and wherein the computer readable program further includes display instructions that when executed on the computing device cause the computing device to:

when the updated content is outputted, un-obfuscate the obfuscated version of the identified sensitive information within the outputted updated content; and exhibit the output updated content with the un-obfuscated sensitive information on the display device.

16. The computer program product of claim 15, wherein the display instructions are executable by a predetermined subset of operators of the computing device.

17. The computer program product of claim 16, wherein the computer readable program further includes audit instructions that when executed on the computing device cause the computing device to record at least one of a date, a time, or a respective one of the predetermined subset of operators that retrieved the updated content and was presented with the updated content exhibited on the display device.

\*  \*  \*  \*  \*